US012772994B2

(12) United States Patent
Gerber et al.

(10) Patent No.: US 12,772,994 B2
(45) Date of Patent: *Oct. 27, 2026

(54) METERING AND CALIBRATION SYSTEM AND PROCESSES FOR FROZEN FLOWABLE CONFECTION FREEZER

(71) Applicant: FLAVOR BURST, LLC, Danville, IN (US)

(72) Inventors: Thomas J. Gerber, Avon, IN (US); Timothy Gerber, Danville, IN (US)

(73) Assignee: Flavor Burst, LLC, Danville, IN (US)

( * ) Notice: Subject to any disclaimer, the term of this patent is extended or adjusted under 35 U.S.C. 154(b) by 113 days.

This patent is subject to a terminal disclaimer.

(21) Appl. No.: 18/922,952

(22) Filed: Oct. 22, 2024

(65) Prior Publication Data

US 2025/0040566 A1 Feb. 6, 2025

Related U.S. Application Data

(63) Continuation of application No. 17/009,307, filed on Sep. 1, 2020, now Pat. No. 12,295,384.

(60) Provisional application No. 62/895,663, filed on Sep. 4, 2019.

(51) Int. Cl.

*A23G 9/28* (2006.01)
*A23G 9/22* (2006.01)
*G01G 19/52* (2006.01)

(52) U.S. Cl.

CPC ............. *A23G 9/283* (2013.01); *A23G 9/282* (2013.01); *G01G 19/52* (2013.01); *A23G 9/228* (2013.01)

(58) Field of Classification Search

CPC ....... G07F 13/04; B67D 1/0008; A23G 9/282; A23G 9/283

USPC .................................................... 141/83, 372

See application file for complete search history.

(56) References Cited

U.S. PATENT DOCUMENTS

| | | | | |
|---|---|---|---|---|
| 4,793,520 A | | 12/1988 | Gerber | |
| 4,923,093 A | | 5/1990 | Gerber | |
| 5,018,363 A | | 5/1991 | Aoki | |
| 6,073,667 A | * | 6/2000 | Graffin | G01G 3/1402 177/229 |
| 6,689,410 B2 | | 2/2004 | Gerber | |
| 7,059,761 B2 | | 6/2006 | Gerber | |
| 7,178,976 B2 | | 2/2007 | Gerber | |
| 7,621,669 B1 | | 11/2009 | Gerber | |

(Continued)

OTHER PUBLICATIONS

Flavor Burst Frozen Beverage, "CTP" Frozen Beverage Models, Brochure (2015).

*Primary Examiner* — Timothy L Maust

(74) *Attorney, Agent, or Firm* — Barnes & Thornburg

(57) ABSTRACT

An apparatus and a method of dispensing a flavored confection include a freezer to hold a flowable confection and a door that connects to the freezer. The door includes a syrup delivery system including one or more syrup pumps. The one or more syrup pumps are configured to deliver a flavored syrup into a container. A load cell assembly including a load cell configured to measure the weight of a container and the contents of the container holds the container adjacent to said freezer and the door. The syrup pump delivers the flavored syrup into the container for a predetermined period of time, and the flowable confection is dispensed from said freezer to the container until the load cell measures a predetermined weight for the container and the contents within the container.

20 Claims, 11 Drawing Sheets

(56) References Cited

U.S. PATENT DOCUMENTS

| | | | | |
|---|---|---|---|---|
| 7,665,398 | B2 | 2/2010 | Gerber | |
| 8,403,179 | B1 | 3/2013 | Gerber | |
| 8,872,045 | B2 * | 10/2014 | Sobiech | B67C 3/202 177/116 |
| 9,670,045 | B2 * | 6/2017 | Riggio | B67C 3/24 |
| 11,464,242 | B2 | 10/2022 | Gerber | |
| 12,295,384 | B2 * | 5/2025 | Gerber | A23G 9/282 |
| 2006/0213922 | A1 | 9/2006 | Lodter | |
| 2015/0216201 | A1 | 8/2015 | Bruckner | |

* cited by examiner

METERING AND CALIBRATION SYSTEM AND PROCESSES FOR FROZEN FLOWABLE CONFECTION FREEZER

CROSS REFERENCE TO RELATED APPLICATIONS

This application is a continuation of U.S. Nonprovisional application Ser. No. 17/009,307, filed on Sep. 1, 2020, which claims priority from U.S. Provisional Application No. 62/895,663, filed on Sep. 4, 2019, the entirety of which are each hereby incorporated by reference herein.

BACKGROUND

The present invention pertains to a metering and calibration system for dispensing a flavored, flowable confection.

Flavored frozen confections such as milk shakes are popular items to be consumed with a meal or as a dessert. However, these confections can be time-intensive to make. Some restaurants may want to decrease the amount of time needed to make a flavored confection by automating a portion of the process. Due to the variable nature of the flowable confection based on the storage temperature and other factors, it is often difficult to ensure that correct ratio of flowable confection to flavored syrup is achieved when the creation process is automated. Varying this ratio of flowable confection to flavored syrup changes the taste of the final product and may leave a customer unsatisfied.

Thus, there is a need for improvement in this field.

SUMMARY

The applicant observed that due to the variable nature of the flowable confection based on the storage temperature and other factors, it is often difficult to ensure that correct ratio of flowable confection to flavored syrup is achieved when the creation process is automated. Varying this ratio of flowable confection to flavored syrup changes the taste of the final product and may leave a customer unsatisfied.

Certain embodiments include an apparatus for dispensing a flavored confection. The apparatus includes a freezer configured to hold a flowable confection and a syrup delivery system including one or more syrup pumps. The one or more syrup pumps are configured to deliver a flavored syrup into a container. A load cell assembly for holding the container is adjacent to the freezer. The load cell assembly includes a load cell configured to measure the total weight of the container, where the total weight includes the weight of the container and the weight of the contents of the container.

To create the flavored confection, the syrup pump delivers the flavored syrup into the container for a predetermined period of time, and flowable confection is delivered from the freezer to the container until a predetermined weight is measured. The flowable confection and the flavored syrup can be delivered from different nozzles and may be delivered simultaneously or serially. A final settled weight for the container and the flavored syrup and flowable confection within the container may be greater than the predetermined weight. Preferably, the final settled weight of the container includes the weight of the syrup and the weight of the flowable confection in a predetermined ratio of syrup to flowable confection.

Some embodiments of the apparatus for dispensing a flavored confection include a controller in electrical communication with the load cell, and the load cell is configured to communicate the measured weight of the container and the contents of the container to the controller. The controller may include a memory for storing one or more predetermined periods of time for delivery of the flavored syrup and the memory may store one or more predetermined weights for the delivery of flowable confection. The controller ceases delivery of the flavored syrup after the predetermined period of time elapses and wherein the controller ceases delivery of the flowable confection after the predetermined weight as measured by the load cell has been reached.

A confection valve is in communication with the freezer. The confection valve is configured to allow the flowable confection to flow from the freezer into the container when the container is positioned adjacent to the confection valve.

A syrup delivery system may include a syrup storage tray that holds a quantity of flavored syrup. A syrup nozzle is configured to dispense flavored syrup from the syrup delivery system into a container when the container is adjacent to the syrup nozzle. A syrup delivery tube extends between the syrup storage tray and the syrup nozzle, and flavored syrup is delivered from the syrup storage tray to the syrup nozzle through the syrup delivery tube. The syrup delivery system may include one or more syrup pumps. Each syrup pump may be configured to deliver a different flavor of flavored syrup.

The apparatus may also include a user interface configured to allow a user to select characteristics of the flavored confection. The user interface enables a user to choose a variety of flavored confection from a plurality of varieties of flavored confections. The variety of flavored confection chosen determines the flavor of flavored syrup that is delivered by the syrup delivery system. Notably, the predetermined period of time for syrup delivery is dependent on the flavored confection and serving size. The predetermined weight for flowable confection delivery is dependent from serving size and may also be dependent on the flavored confection. The user interface may enable a user to select the serving size to be dispensed by the system.

Certain embodiments also include a method of dispensing a flavored confection that includes dispensing flavored syrup into a container from a syrup nozzle for a predetermined period of time and dispensing a flowable confection into the container from a confection valve until a predetermined weight is reached. The predetermined weight may be an actual measured weight, such as the weight of the container and its contents (e.g., flowable confection or flowable confection and syrup). Alternatively, the predetermined weight may be a difference between a first weight (e.g., the weight of a container without flowable confection) and a second weight (e.g., the weight of a container and flowable confection contained in the container). In some embodiments, the syrup and the flowable confection are dispensed into the container simultaneously. After the flowable confection and flavored syrup are dispensed into the container, the flavored syrup and the flowable confection can be mixed within the container either by hand or using a machine.

The predetermined weight is less than a final settled weight. The final settled weight, which is the weight of the container and its contents after flowable confection has stopped flowing into the container and has come to rest therein, also includes the weight of the syrup. Moreover, the final settled weight may include the weight of the flowable confection and syrup in a predetermined ratio of syrup to flowable confection.

Some embodiments of the method of dispensing a flavored confection may include weighing the container and the flavored syrup and the flowable confection dispensed into the container using a load cell. The dispensing of the flavored syrup and the dispensing of the flowable confection may be controlled using a controller electrically connected to the load cell.

Other embodiments may include a user interface on which a user selects the serving size of the flowable confection to be dispensed and the flavored syrup. The user may also select a desired flavor of syrup from a plurality of syrups on the user interface.

Further forms, objects, features, aspects, benefits, advantages, and embodiments of the present invention will become apparent from a detailed description and drawings provided herewith.

DESCRIPTION OF THE SELECTED EMBODIMENTS

Figure 1A:
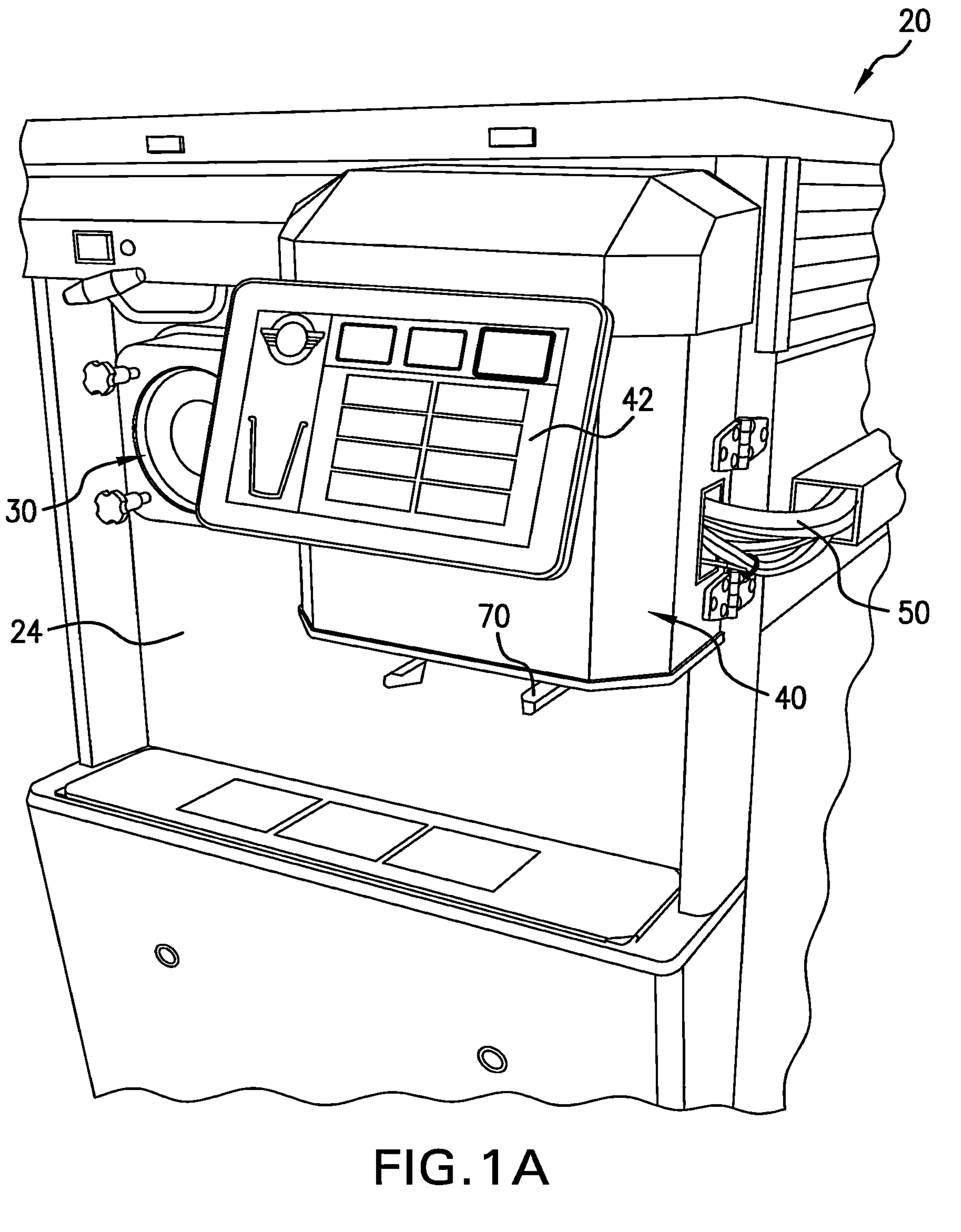
FIG. 1A is a front perspective view of a flavored confection freezer.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1B:
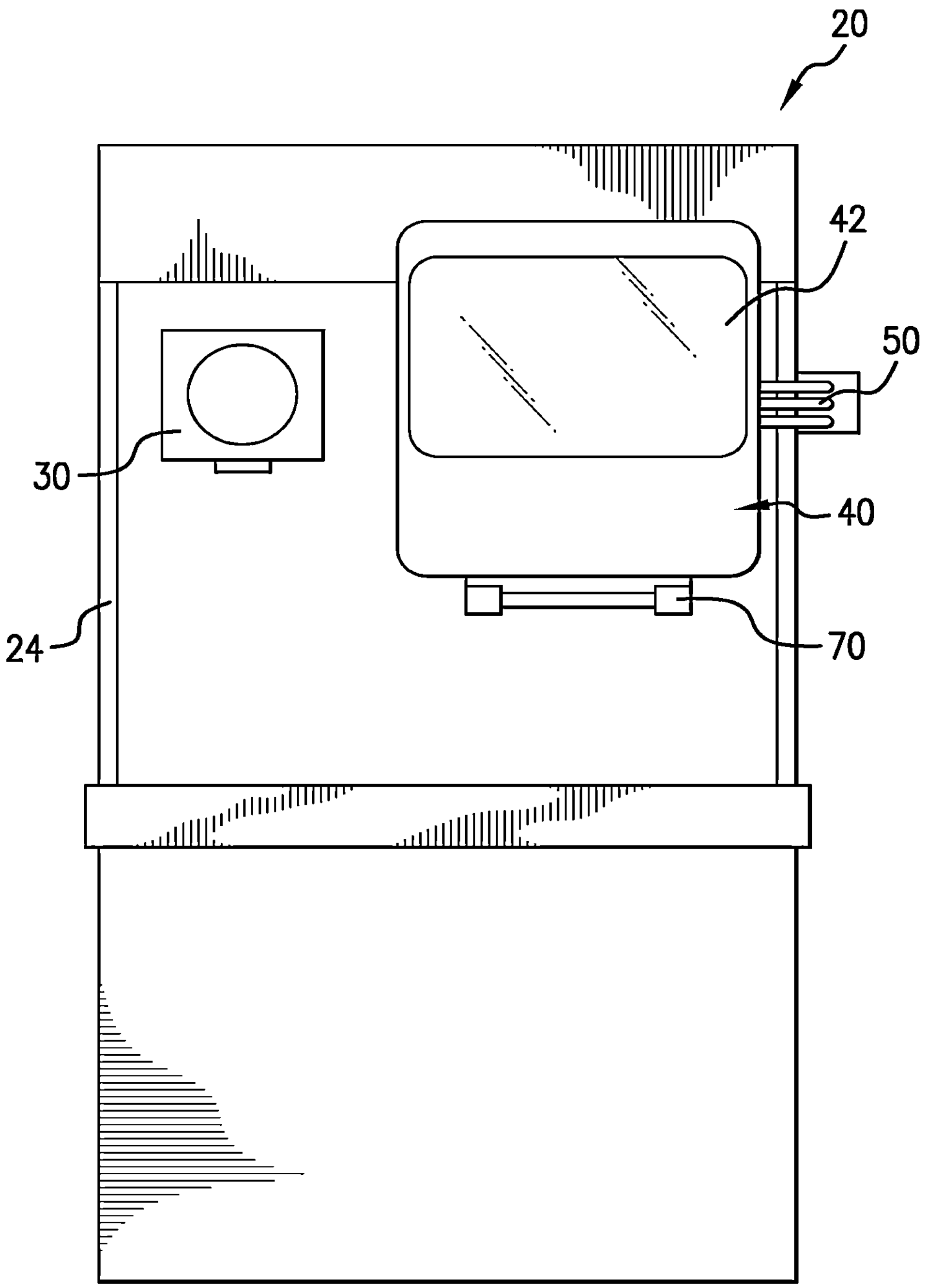
FIG. 1B is a schematic front view of the flavored confection freezer of FIG. 1A.

FIGS. 1A and 1B illustrate an embodiment of a flavored confection freezer 20 useful for creating a flavored confection having a mixture of a flowable confection and flavored syrup. The freezer 20 includes a cabinet 24 that includes one or more barrels 30 for storing a quantity of a flowable confection. A door 40 is mounted to or integrally formed with the cabinet 24 and operationally connected to at least one of the barrels 30. A syrup delivery system 50 for supplying flavored syrup to be mixed into the flavored confection is connected to the dispensing apparatus. The door 40 may also include a controller that includes a graphical user interface 42 for controlling the type of flavored syrup to be added to the flowable confection and the amount of flowable confection that is dispensed from the door 40. The door 40 includes a load cell assembly 70 capable of holding a container for collecting the flowable confection dispensed from barrel 30 and syrup dispensed form the syrup delivery system 50. The load cell assembly 70 is configured to measure the weight of the container and the contents of the container as the flowable confection is dispensed.

Figure 2:
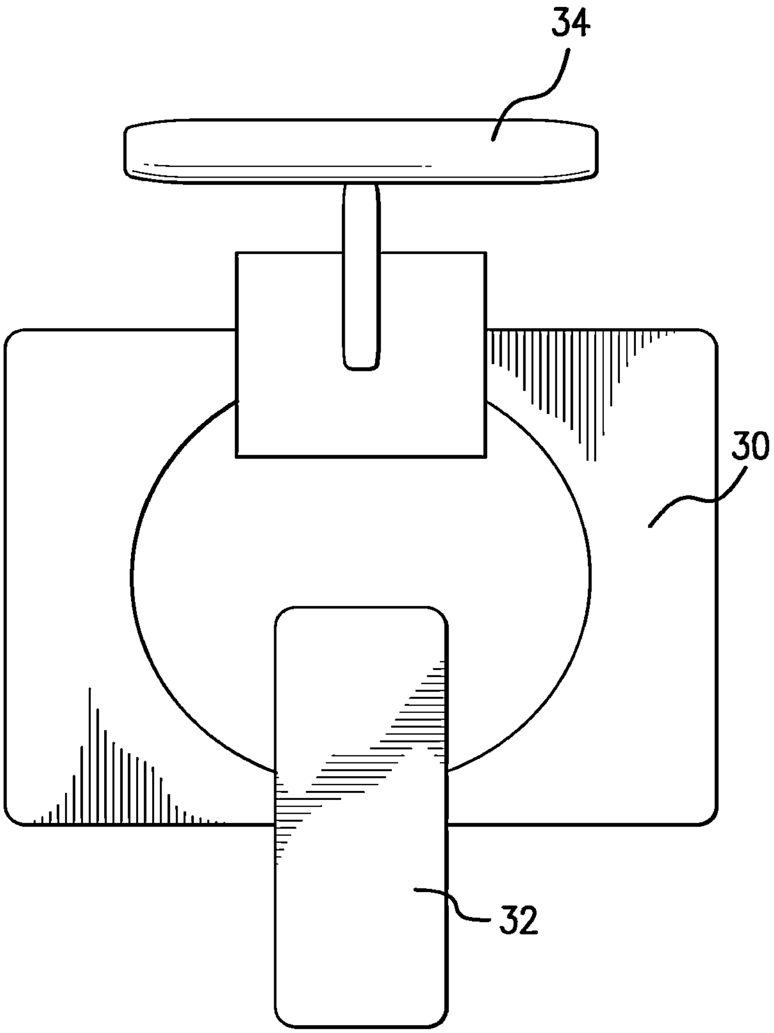
FIG. 2 is a front view of a barrel and confection valve from the flavored confection freezer of FIG. 1A.

FIG. 2 illustrates a barrel 30 contained within cabinet 24 of freezer 20. Barrel 30 is a storage area for the frozen, flowable confection, for example, soft serve ice cream used to make milk shakes. Cabinet 24 may include refrigeration or freezing systems so that the contents of barrel 30 may be maintained at a predetermined temperature range to prevent melting or to prevent the confection from becoming too cold so that it is no longer flowable. Barrel 30 communicates with a confection valve 32 that controls a flow of flowable confection from inside the barrel 30 to a location exterior of the barrel 30. A draw handle 34 is operatively attached to the confection valve 32. Operation of the draw handle 34 controls whether confection valve 32 is open or closed. When confection valve 32 is open, the flowable confection stored within barrel 30 is dispensed from confection valve 32. When confection valve 32 is closed, dispensing of the flowable confection is stopped and the flowable confection is kept within barrel 30.

Figure 3A:
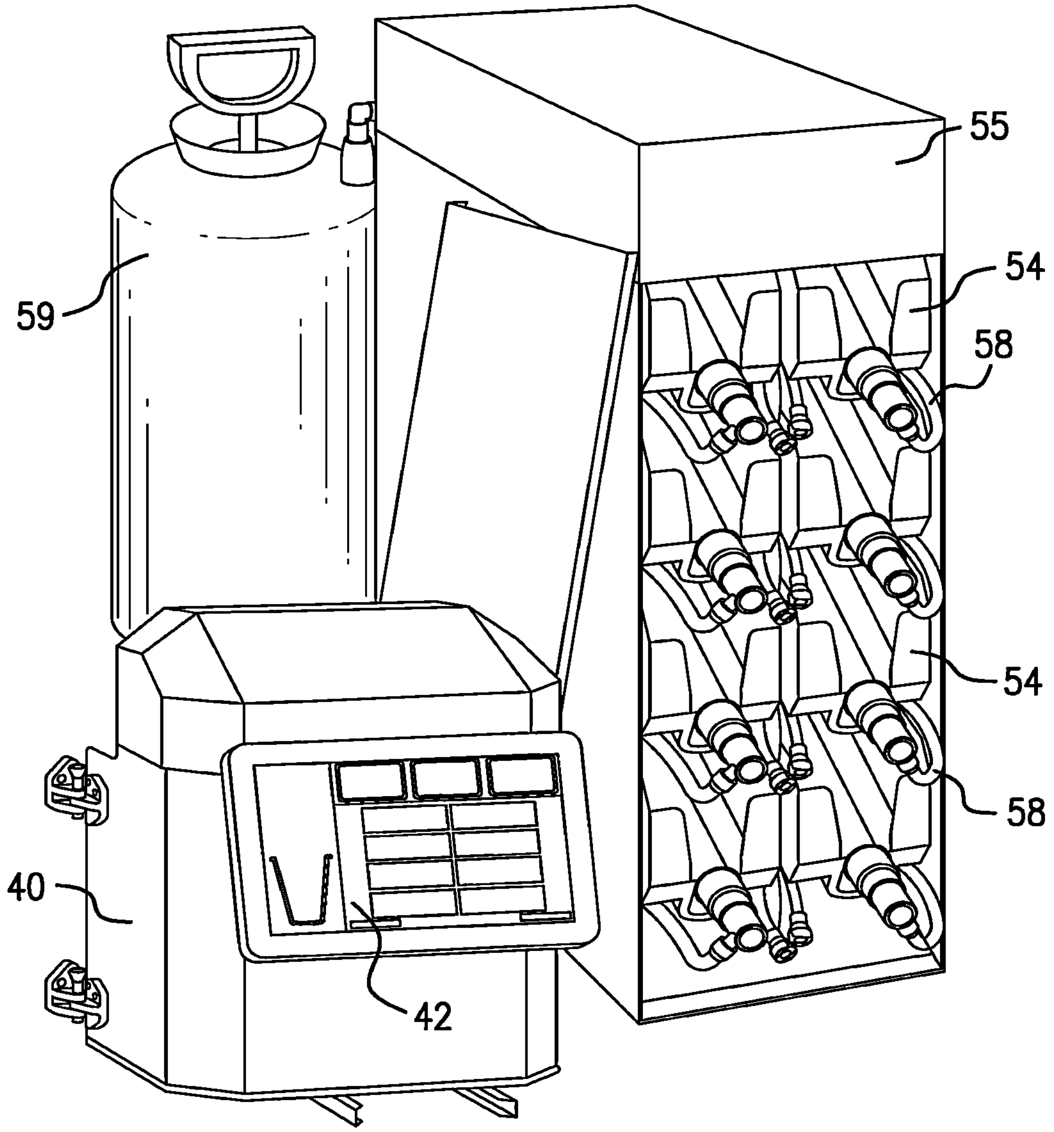
FIG. 3A is a perspective view of a syrup delivery system of the flavored confection freezer of FIG. 1A.
Figure 3B:
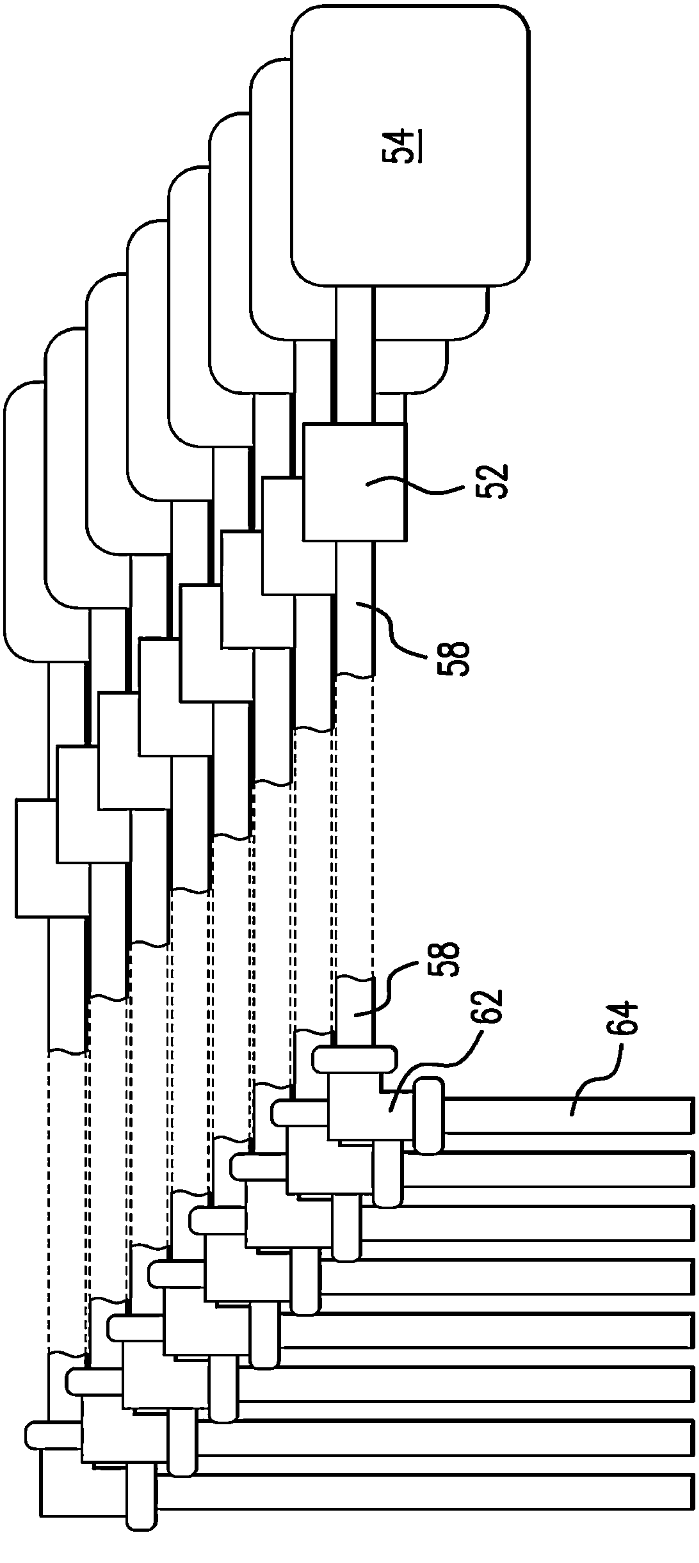
FIG. 3B is a schematic side view of the syrup delivery system of FIG. 3A.

The syrup delivery system 50 is shown in FIGS. 3A-3B. The syrup delivery system 50 includes one or more syrup trays 54 stored in a syrup cabinet 55. Each syrup tray 54 is configured to retain a syrup bag holding a quantity of flavored syrup. In the embodiment shown, the syrup cabinet 55 is a separate structure than both the door 40 and the cabinet 24 of the freezer 20. However, in some embodiments, the syrup cabinet may be contained within the cabinet 24.

As shown in FIG. 3B, syrup pumps 52 are fluidly connected to syrup bags in the respective syrup trays 54 by a syrup delivery tube 58. Typically, the syrup pumps 52 are housed within the syrup cabinet 55 with the syrup trays 54. One end of a syrup delivery tube 58 is associated with a respective syrup tray 54. The syrup delivery tube 58 is in communication with the syrup pump 52, and an opposing end of the syrup delivery tube is connected to a syrup nozzle 64 by an elbow fitting 62. Elbow fitting 62 provides a sealing swivel that allows door 40 to be opened and closed with a minimal effect on the positioning of the syrup delivery tube 58. Advantageously, the sealing swivel allows the door 40 to be opened and closed without significant resistance from the syrup delivery tubes and allows the door 40 to remain in an open position and/or in a closed position without the syrup delivery tubes exerting a biasing force against the door into a closed and/or open position.

Flavored syrup from the syrup tray 54 can be pumped through syrup delivery tube 58 to syrup nozzle 64. The syrup then exits syrup nozzle 64 and is ejected into a container held by load cell assembly 70. Similar to the elbow fitting 62, the syrup nozzle 64 may not be permanently affixed to a mounting plate or to another object, but, instead, may be allowed to swivel freely with respect to the door 40. As illustrated in FIG. 3A, in some embodiments, syrup delivery system 50 may also include a sanitizer tank 59. Sanitizer tank 59 stores sanitizer solution that is used to flush and sanitize the syrup delivery tubes 58 and the syrup pumps 52.

FIGS. 3A and 3B show a total of eight syrup trays 54; however, in other embodiments, the syrup delivery system 50 may include more or fewer syrup trays 54 as desired. As an example, the syrup delivery system may include eight syrup trays 54. The arrangement of the syrup trays 54 and the syrup nozzles 64 may also be modified as desired. For example, in some embodiments, the syrup nozzles 64 may be arranged linearly, but in other embodiments, the syrup nozzles 64 may be arranged in multiple adjacent rows or bundled in a circular arrangement to reduce the overall length of the nozzle arrangement of syrup delivery system 50. Additionally, the length of syrup delivery tube 58 may be shortened or lengthened as needed and/or may be bent or curved as necessary depending on the position of the syrup nozzle 64 with respect to syrup tray 54 to allow syrup delivery tube 58 to extend between syrup nozzle 64 and syrup tray 54.

Each syrup tray 54 provides a separate storage area for a different flavor of flavored syrup. The syrup delivery tubes 58 and corresponding syrup nozzles 64 each connect to a single syrup tray 54 to prevent the different flavored syrups from mixing when dispensed. If only a single syrup nozzle 64 were used to dispense each of the flavored syrups held in the syrup trays 54, it is possible that residual flavored syrup stuck on the walls of syrup delivery tube 58 or syrup nozzle 64 could mix with the flavored syrup being dispensed. This could change the flavor of the flavored syrup and create an undesirable taste. However, as shown in FIGS. 3A-3B, because each syrup nozzle 64 only dispenses the flavored syrup from a single syrup tray 54, there is no opportunity for residual flavored syrup of a different flavor to mix with the desired flavor being dispensed.

Figure 4:
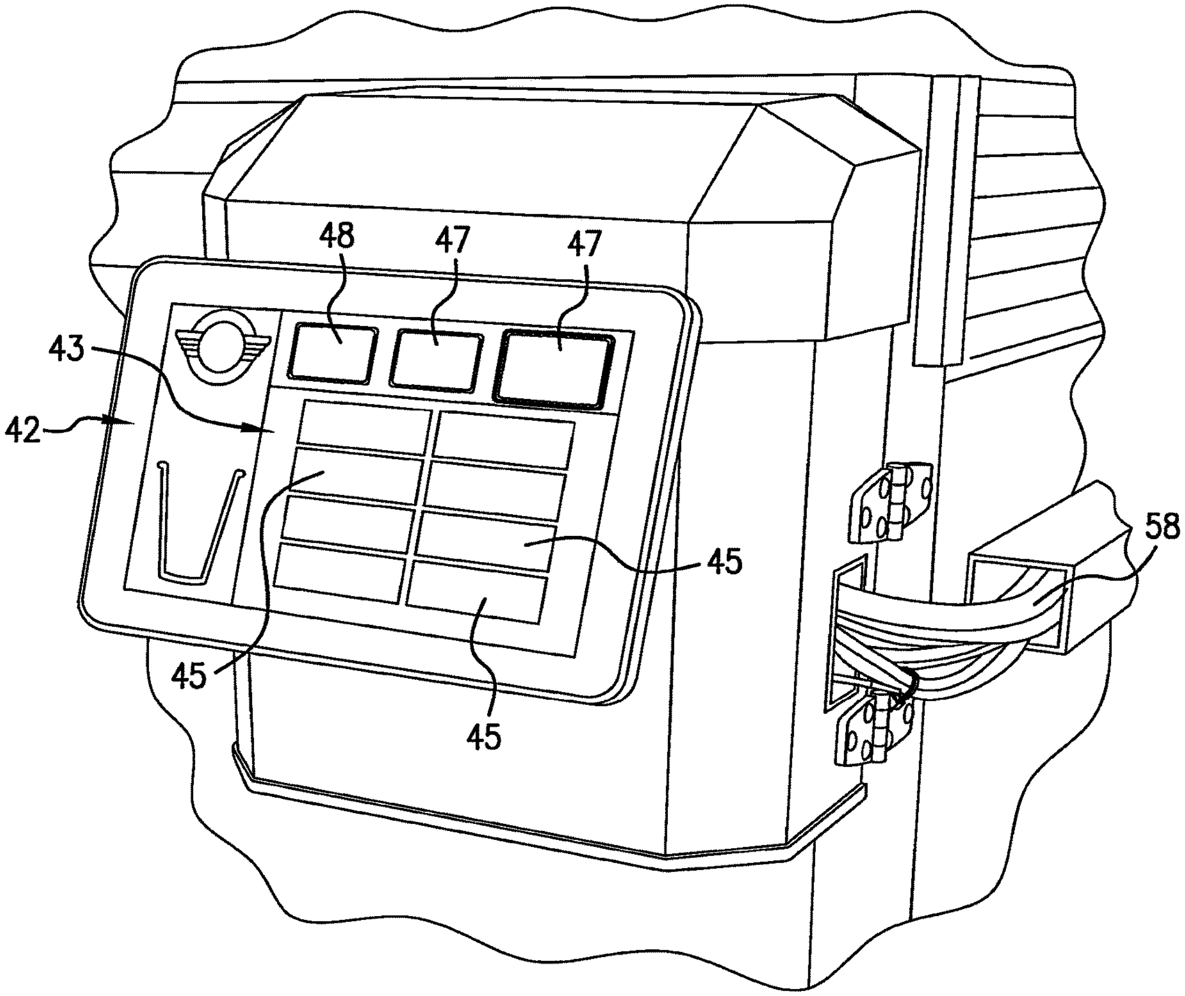
FIG. 4 is a perspective view of a user interface of the flavored confection freezer of FIG. 1A.

A perspective view of the door 40 and the graphical user interface 42 is shown in FIG. 4. Graphical user interface 42 is positioned on the front of door 40 so that it is easily accessible. As shown in FIG. 4, graphical user interface 42 includes a touch screen display; however, in other embodiments, graphical user interface 42 may be a digital display that accepts input through pressing buttons or any other acceptable method of input. The display 43 of graphical user interface 42 includes variety icons 45 for each of the available varieties of flavored confection that may be produced from door 40. Selecting a certain variety icon 45 instructs the door 40 to dispense a certain flavor or multiple flavors of flavored syrup from syrup pumps 52 to create the desired variety of flavored confection.

Graphical user interface 42 may also include size icons 47 for selecting the serving size of the flavored confection that is to be dispensed by door 40. In the embodiment shown in FIG. 4 two different size options are shown. However, in other embodiments, more or fewer sizes may be provided. Alternatively, a single size icon 47 may be present and pressing the size icon 47 may lead to another screen on display 43 that allows a user to choose from multiple serving size options. An additional options icon 48 may also be provided on graphical user interface 42 to allow further customization of the flavored confection dispensed from door 40. As an example, the additional options icon 48 can allow for selection of multiple varieties of flavored confection to be dispensed into a single container.

Figure 5A:
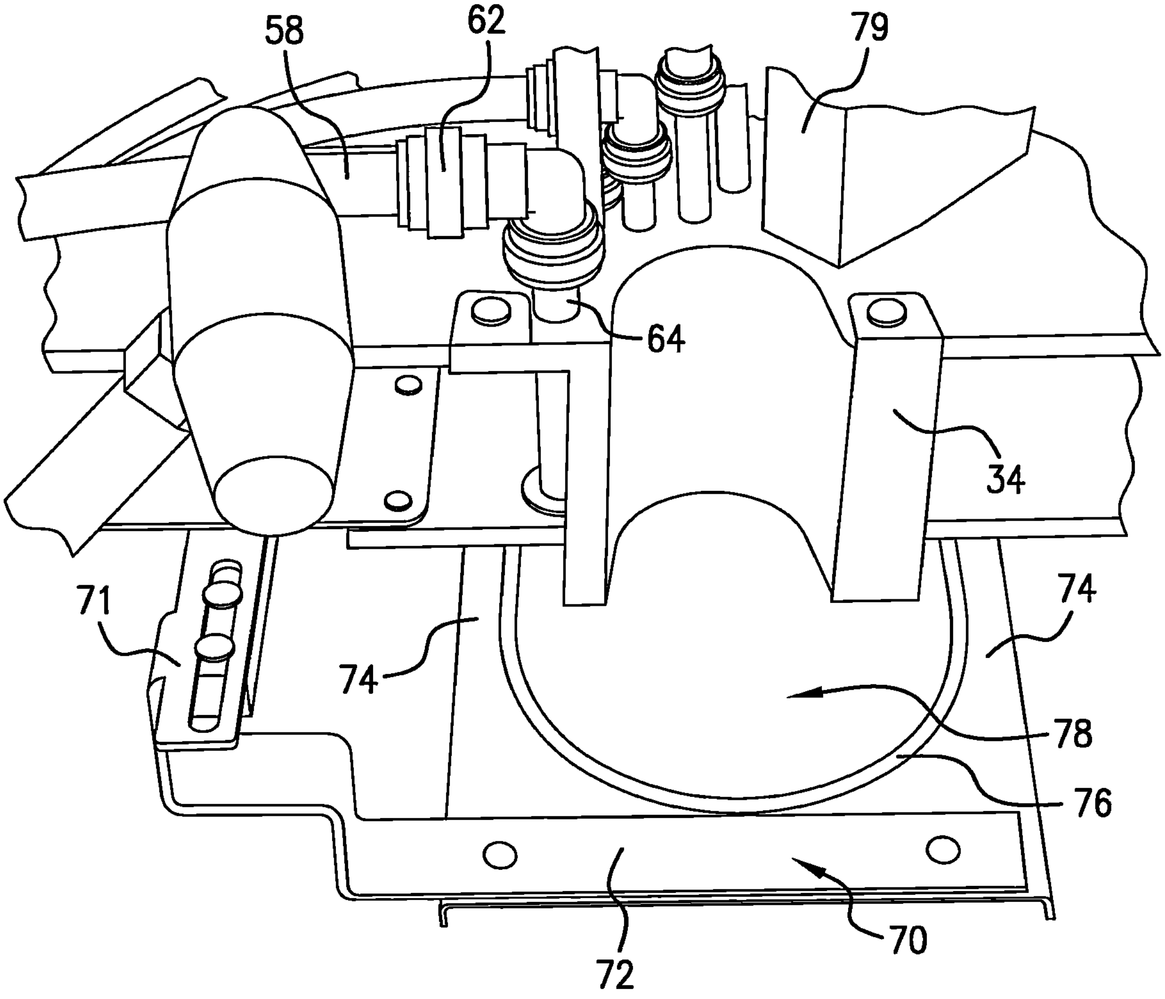
FIG. 5A is a rear perspective view of a load cell assembly of the flavored confection freezer of FIG. 1A.
Figure 5B:
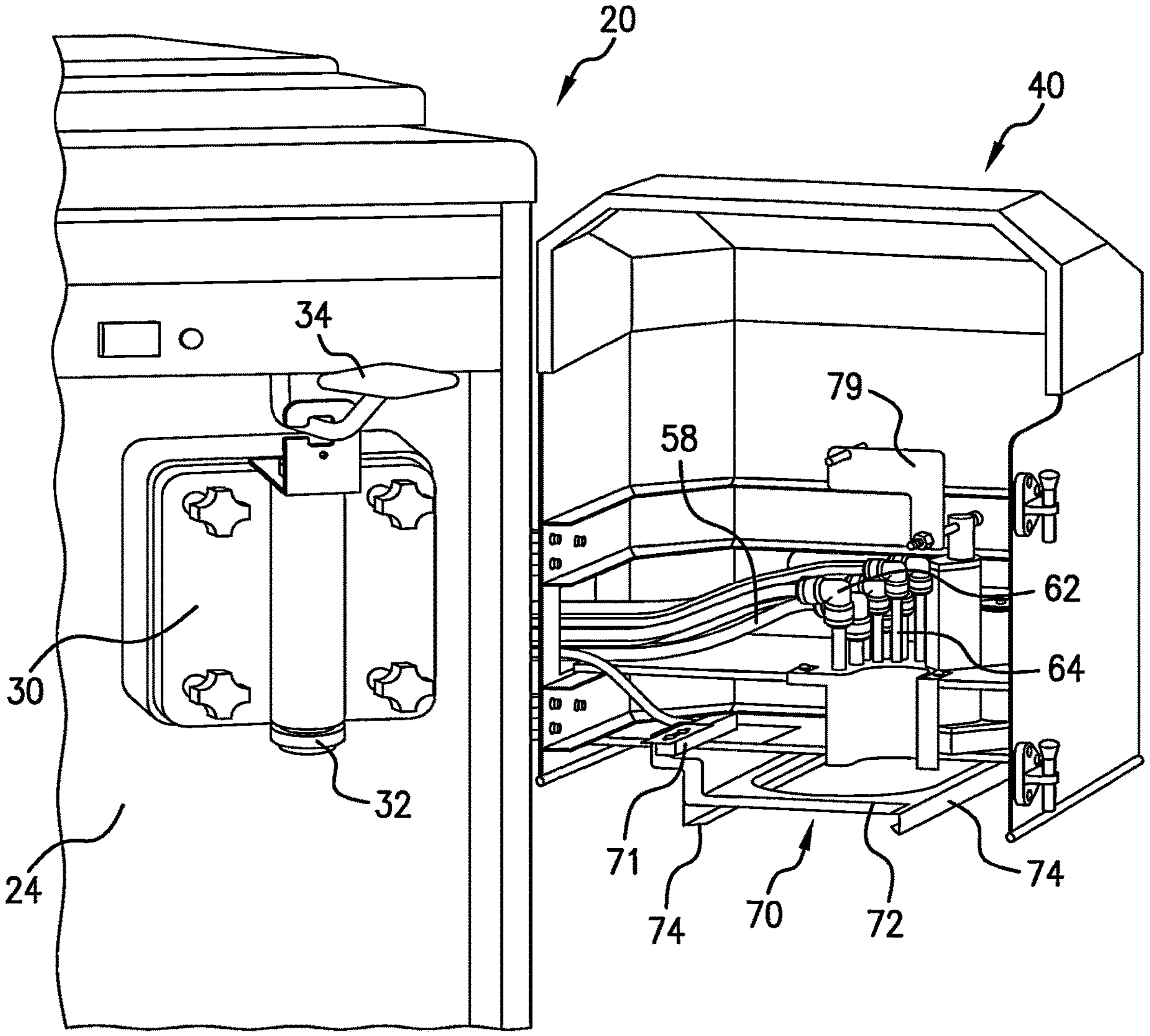
FIG. 5B is a schematic view of the load cell assembly of FIG. 5A.

A rear perspective view of the door 40 is illustrated in FIGS. 5A and 5B. As shown, door 40 may be removably attached to cabinet 24. The removable attachment allows door 40 to be retrofitted onto different types of cabinets or onto older cabinets. The door 40 may also be removed or hinged away from cabinet 24 to allow cleaning of cabinet 24 and barrel 30 and confection valve 32 without interference from door 40. Although door 40 is shown to be hinged or removable from cabinet 24 in FIGS. 5B, in other embodiments, door 40 is integrally formed with cabinet 24.

Load cell assembly 70 includes a load cell 71 that is attached to a load cell base 72 with a load cell arm 74 extending from each side of load cell base 72 so that load cell arms 74 are parallel to each other. The load cell 71 may be any type of force gauge that is capable of adjusting an electrical signal and/or resistance in relation to the force that is experienced by the gauge. A semi-circular lip 76 shaped to correspond to the top of a container borders each of the load cell arms 74. The semi-circular lip 76 defines a container opening 78 that extends through the thickness of the load cell assembly 70. Load cell assembly 70 is attached to door 40. Advantageously, attaching the load cell assembly 70 to the door can allow the load cell assembly 70 to swing away from the cabinet, with door 40, when the door 40 is opened. This can aid in providing space to allow for cleaning of cabinet 24. Otherwise, if load cell assembly 70 is not attached to door 40, load cell assembly 70 may be provided as a separate piece from cabinet 24 to allow removal of load cell assembly 70 when cabinet 24 is cleaned.

As shown in FIGS. 5A and 5B, load cell assembly 70 is positioned adjacent to the syrup nozzles 64 of syrup delivery system 50 to allow flavored syrup from the syrup nozzles 64 to be dispensed into a container held by load cell assembly 70 within container opening 78. When door 40 is mounted to freezer 20 and closed, a confection valve 32 of freezer 20 is positioned adjacent to load cell assembly 70 to allow flowable confection dispensed from confection valve 32 to be dispensed into a container held by load cell assembly 70 within container opening 78.

A confection actuator 79 is provided in door 40 that is operatively attached to a draw handle 34 that operates to open and close the confection valve 32 to control the flow of flowable confection from confection valve 32. Operation of the confection actuator 79 allows flowable confection to be dispensed from confection valve 32 without requiring door 40 to be opened or to be hinged on cabinet 24 to access the draw handle 34.

Figure 6:
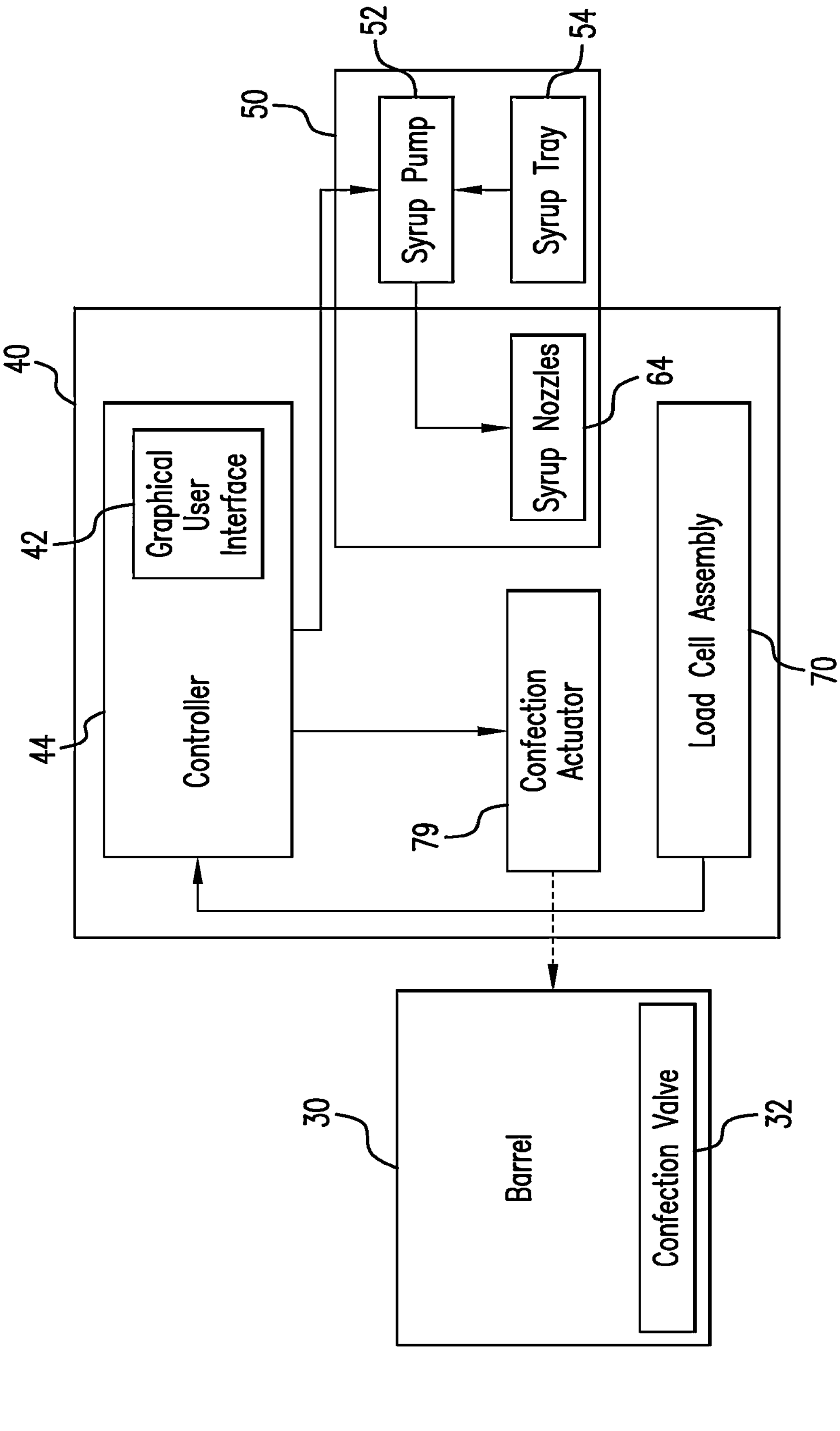
FIG. 6 is a block diagram of a dispensing apparatus of the flavored confection freezer of FIG. 1A.

A block diagram of the door 40 with the barrel 30 and confection valve 32 is illustrated in FIG. 6. The door 40 includes a graphical user interface 42 which may be separate to or a part of a controller 44 that communicates with the confection actuator 79 for actuating confection valve 32, the syrup pump 52 of the syrup delivery system 50, and the load cell assembly 70. The controller 44 may be any type of device or combination of devices that is able to accept input and use that input to control the process of dispensing the flowable confection and the flavored syrup. As an example, controller 44 may be a computer, tablet, or a programmable logic controller. The controller 44 may include a single control for actuating both the confection actuator 79 and the syrup pump 52 or the controller 44 may include a first control for actuating the confection actuator 79 and a second control for actuating the syrup pump 52.

A user may interact with the controller 44 using the graphical user interface 42 to specify parameters for a desired type of product made using the flowable confection, such as flavor and serving size. The information provided by the user on graphical user interface 42 may include dispensing instructions stored in a memory for the type of product specified by the user. Additionally, as illustrated, the syrup nozzles 64 may be held within the door, while other portions of the syrup delivery system 50, such as the syrup pumps 52 and the syrup trays 54 may be located exterior of the door.

The controller 44 is in communication with the confection actuator 79 and the syrup pump 52 so that the controller 44 may control the flow of flowable confection from the confection valve 32 of the barrel 30 and the flow of flavored syrup from the syrup nozzles 64. The controller 44 is also in communication with load cell assembly 70, which sends data regarding the measured weight for a container held by the load cell assembly 70 to the controller 44. The connection between load cell assembly 70 and controller 44 allows the flow of flowable confection and/or the flow of flavored syrup to be measured and/or controlled by weight. Alternatively, the controller 44 may control the flow of flowable confection and/or the flow of flavored syrup by time. In some embodiments, the controller 44 may operate to control the flow of flowable confection by weight while the flow of flavored syrup is controlled by time or vice versa.

Figure 7:
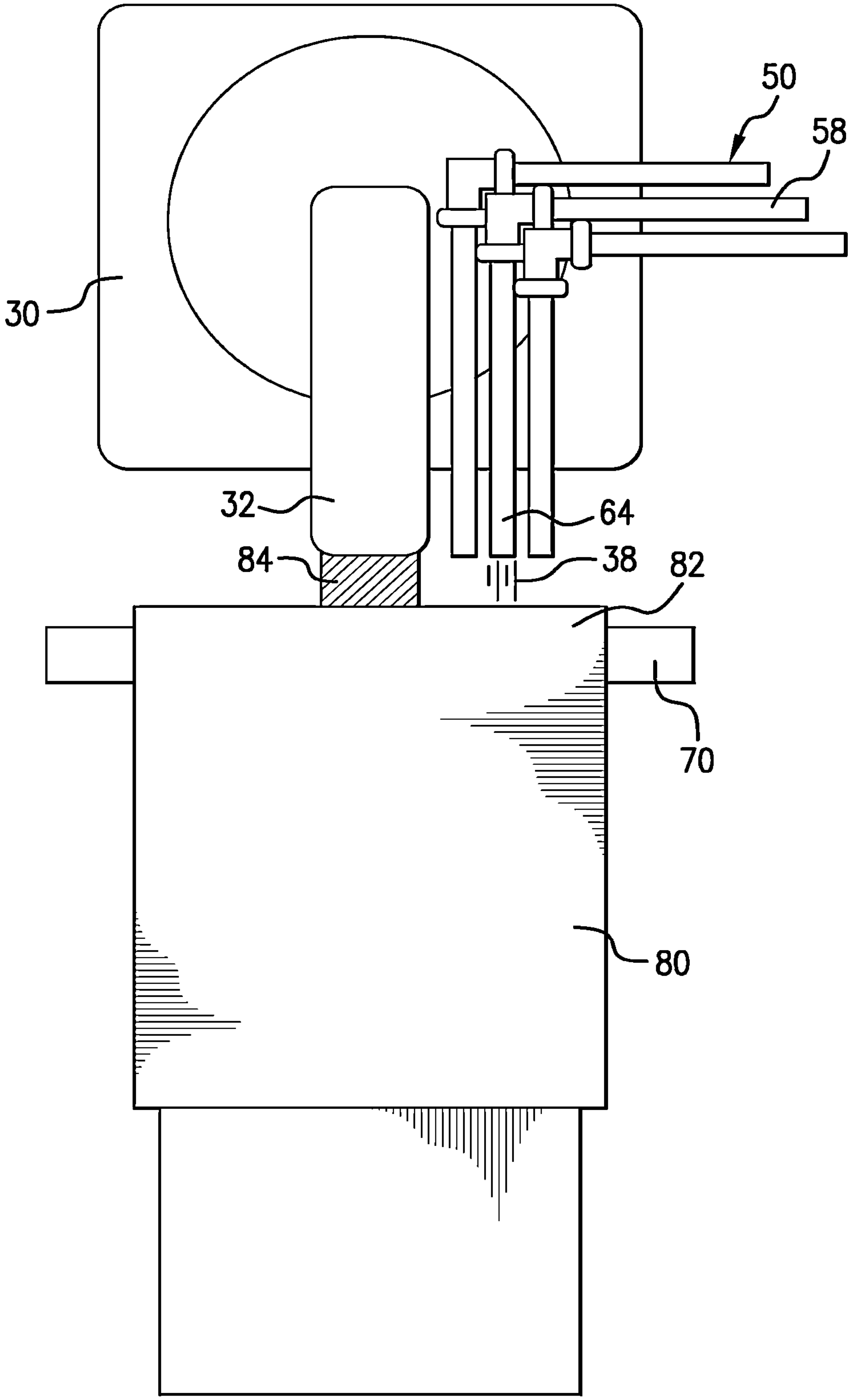
FIG. 7 is a partial front view of a container being filled with a flavored confection from the flavored confection freezer of FIG. 1A.

FIG. 7 shows a schematic view of freezer 20 and door 40 to illustrate a flowable confection 84 and flavored syrup 88 being dispensed into a container 80. As shown, the container 80 is held by load cell assembly 70 at a lid portion 82 of container 80 so that the lid portion 82 is positioned underneath confection valve 32 and near syrup nozzles 64. When container 80 is held by load cell assembly 70, flowable confection 84 dispensed from confection valve 32 and flavored syrup 88 dispensed from syrup nozzles 64 is directed into container 80. The flowable confection 84 and the flavored syrup 88 may be dispensed simultaneously to decrease the time that it takes to make the flavored confection. However, in other embodiments, the flowable confection 84 and flavored syrup 88 may be dispensed serially.

Load cell 71 measures a total weight of container 80, which includes the weight of the container 80 and any flowable confection 84 and/or flavored syrup 88, contained therein. The total weight can be monitored as flowable confection 84 and flavored syrup 88 are added to container 80 and then transmitted to the controller 44 as illustrated in the block diagram of FIG. 6.

Positioning the load cell assembly 70 so that load cell assembly 70 holds the container 80 near the lid portion 82 allows load cell assembly 70 to hold a variety of different of sizes of containers 80 at the same distance from the confection valve 32 and the syrup nozzles 64. This improves repeatability of the flavor of the flavored flowable confection. Additionally, holding the lid portion 82 near the confection valve 32 and the syrup nozzles 64 rather than farther away from the confection valve 32 and syrup nozzles 64 reduces the opportunity for contaminants from the air to mix with flowable confection 84 or flavored syrup 88 and reduces the likelihood that flowable confection 84 or flavored syrup 88 will miss the container and be spilled while being dispensed.

The positioning of load cell assembly 70 near the top of the container 80 rather than underneath container 80 also reduces the likelihood that excess flowable confection 84 or flavored syrup 88 is spilled onto load cell assembly 70, creating the risk that the load cell assembly 70 will measure the extra weight of the spilled flowable confection 84 and/or flavored syrup 88 that is not actually included in the container. Furthermore, positioning load cell proximate the confection valve 32 and syrup nozzles 64 provides space for an operator to position a bucket or other similar device under the confection valve 32 during cleaning of the freezer 20.

The separation created by dispensing the flowable confection and the flavored syrup from different valves and nozzles assists to create a more accurate measurement of the weight of flavored syrup and the weight of flowable confection in the container so the correct ratio of flavored syrup to flowable confection can be achieved. Dispensing the flavored syrup from the syrup nozzle 64 instead of through the confection valve 32 prevents resistance from the flowable confection from slowing the flow of flavored syrup if both the flavored syrup and flowable confection are dispensed at the same time. A slower flow of flavored syrup causes less flavored syrup to be added to the container over a given span of time, changing the ratio of flavored syrup to flowable confection and changing the taste of the flavored confection.

Figure 8:
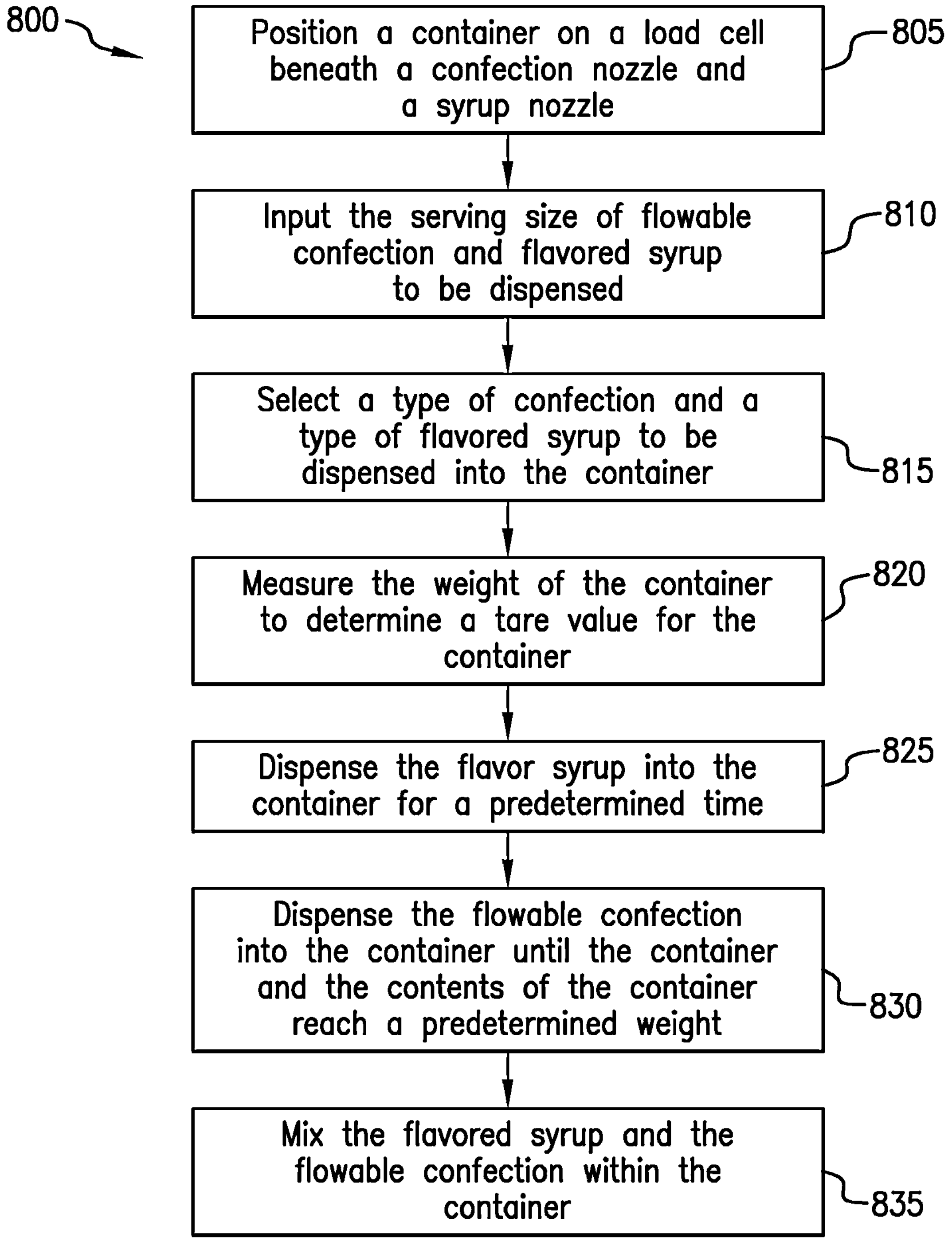
FIG. 8 is a flowchart illustrating a method of dispensing a frozen, flowable confection.

A method of dispensing a frozen, flowable confection is described in the flow chart 800 illustrated in FIG. 8. In a first step 805, a container is positioned on a load cell so that the container is positioned beneath a confection valve and a syrup nozzle, so that flowable confection from the confection valve and flavored syrup from the syrup nozzle is dispensed into the container. The load cell is configured to measure the weight of the container positioned on the load cell and the weight of the contents of the container.

In a second step 810, the serving size the flavored confection to be dispensed is input to the dispenser. Different selections of serving size can affect the amount of flowable confection that is to be dispensed as well as the amount of flavored syrup to be dispensed. After inputting the desired serving size, the load cell measures the weight of the empty container, prior to being filled with the flowable confection and flavored syrup. In some embodiments, the user may be prompted to choose the size of the container that has been loaded onto the load cell by a user interface. In other embodiments, the size of the container is automatically detected by the dispenser based upon the weight of the container that is placed on the load cell.

In a third step 815, the type of flavored syrup to be dispensed into the container is selected. In some embodiments, the selection of the flavored syrup is made using a user interface that is part of the dispenser. The user interface may simplify the selection process by including a single button that corresponds to an available variety of the flavored confection. A controller in the dispenser may then determine the flavor or flavors of flavored syrup that are needed for that variety. The user interface may also allow for greater customization by allowing a user to choose the type or types of flavored syrup to be added without being guided by a listing of available varieties.

In a fourth step 820, the weight of the empty container to be filled is weighed by the load cell assembly and communicated to the controller. The measured weight acts as a tare value that is subtracted from the overall weight measured by the load cell assembly as the container is filled with flowable confection and flavored syrup. This allows different types of containers with varying weights to be used without affecting the measurement of the ratio of the weight of flavored syrup to the weight of flowable confection.

In a fifth step 825, the syrup pump is actuated for a predetermined period of time to dispense flavored syrup into the container. This predetermined period of time is calculated according to a recipe that is based on the serving size and the variety of flavored confection that is selected. The predetermined period of time for dispensing the flavored syrup provides the flavored confection with the correct ratio of weight of syrup compared to the weight of the flowable confection to achieve the desired flavor profile for the flavored confection. The recipe including the predetermined period of time is stored by the controller included in the dispenser or in another form of memory.

In some embodiments, a single flavor of flavored syrup is dispensed into the container; however, in other embodiments multiple flavors may be dispensed into the container by actuating multiple syrup pumps. Each syrup pump may have a different predetermined period of time for dispensing depending on the recipe for the variety of flavored confection chosen. If multiple flavored syrups are dispensed, the flavored syrups may be dispensed simultaneously or may be dispensed at different times, in series.

In a sixth step 830, flowable confection is dispensed into the container until the container and the contents of the container reach a predetermined weight as measured by the load cell. The sixth step 830 may be performed before, after, and/or during with fifth step 825. This predetermined weight is stored in the controller or otherwise stored in the dispenser along with the predetermined time for dispensing the flavored syrup or flavored syrups as described above. This predetermined weight takes into account the weight of the container as indicated in the third step 815 and may also include the weight of the syrup that will be added in fifth step 825 in instances when the sixth step is performed during and/or after the fifth step to provide a desired ratio of flowable confection to flavored syrup to create the desired flavor for the variety of flavored confection that is chosen. The load cell continuously monitors the weight of the container and its contents as the flowable confection is added to the container, and dispensing of the flowable confection is stopped after the predetermined weight is reached.

Because an amount of flowable confection may continue to be added into the container after the confection valve begins closing and/or has closed (e.g., due to flowable confection that is passing through the closing valve and/or falling into the container), the predetermined weight at which the dispensing of the flowable confection is stopped may be less than a final settled weight of the flavored confection. This final settled weight includes the weight of additional flowable confection that is between the confection valve and the container after the confection valve is instructed to close as well as flowable confection that may exit the confection valve as the confection valve is closing. Accordingly, the predetermined weight allows this additional flowable confection to be accounted for when creating the flavored confection and helps to prevent overflow of the container, dispensing of a portion size different (e.g., greater) than that selected by the operator, and/or a ratio of flowable confection to syrup than different (e.g., greater) than that desired.

As used herein, the terms "dispensing" or "delivery" of the flowable confection refer to the flowing of flowable confection from the confection valve while the confection valve is in an open state. The additional flowable confection that is added to the container after the controller has instructed the confection valve to close is not considered to be dispensed for reaching the predetermined weight.

In a seventh step 835, the flowable confection and the flavored syrup is mixed within the container to create a flavored confection that may be eaten or served to a customer. In some embodiments, mixing may be performed by a machine. However, in other embodiments, mixing the flowable confection and the flavored syrup may be done manually.

In some embodiments, an optional calibrating step may be added to the method described in flow chart 800 to determine the predetermined time for dispensing the flavored syrup and/or the predetermined weight for dispensing the flowable confection. In this calibrating step, flavored syrup may be dispensed from one or more syrup nozzles into an empty container for a given period of time and without dispensing flowable confection. The flavored syrup dispense rate may then be calculated by comparing the weight of the dispensed flavored syrup with the given period of time. The flavored syrup dispense rate may then be used to determine the length of time a specific flavored syrup needs to be dispensed in order to dispense the desired amount (e.g., weight) of syrup for a specified serving size and flavor. Because the controller records the flow rate and the dispensing time of each flavored syrup, a calculation can be made during the dispense of the flowable confection and flavored syrup into the same container to determine the portion of the combined dispensed flowable confection that is attributable to the flavored syrup and the portion that is attributable to the flowable confection.

This calibrating step may be run periodically to check that the weight of flavored syrup dispensed in a given amount of time has not changed due to factors such as a pump that is not operating as efficiently or a blockage in a syrup delivery tube or a syrup nozzle. In some embodiments, calibration may also be performed by calculating the time required to dispense enough flavored syrup to reach a predetermined weight of the container including the flavored syrup.

Calibration can be performed without additional user interaction after the calibrating step has been started. The use of the load cell and communication between the load cell and the controller removes the need for visual measuring of the output of flavored syrup and recording the weight of flavored syrup dispensed. Reducing the amount of user interaction with the calibration process increases efficiency and improves accuracy of the calibration process. Additionally, the calibration step can be performed on each of the different flavored syrups automatically, without user interaction to change the type of flavored syrup to be calibrated.

Calibration may also include calibration of the predetermined weight for various serving sizes and/or flavored confections. Such calibration may take into account the amount of flowable confection that enters the container after the process of closing the confection valve has begun. The calibration process may include taking a sample draw of flowable confection and measuring the weight of the product dispensed after the closing procedure for the confection valve begins. This additional weight added after the closing procedure has begun is stored in the controller. The controller then subtracts the stored additional weight from the final settled weight for a given serving size and/or flavored confection to determine the predetermined weight at which to stop dispensing the flowable confection for that selected serving size and/or flavored confection. Therefore, the memory of the controller may store predetermined weight(s) that determines when to instruct the confection valve to close and stop dispensing flowable confection to the container and/or final settled weight(s) to confirm and or calibrate for accuracy. Such value(s) may be stored for more than one serving size and/or flavored confection.

Typically, calibration of the flavored syrup and of the predetermined weight is a setup step that is performed either before the other steps described in flow chart 800 or after all of the other steps described in flow chart 800 have been completed. As an example, calibration may be performed daily at the beginning of the day or at the end of the day. Calibration may also be performed on any other desired schedule or may be performed without a schedule.

The steps described above may be performed in a different order and/or at least some steps may occur simultaneously as desired. As an example, the sixth step may occur before, during, and/or after the fifth step. Similarly, in some embodiments, the second step 810 and the third step 815 may be done concurrently or the order of the second step 810 and the third step 815 may be reversed. For example, the serving size may be determined or input before the type of flavored syrup to be dispensed into the container is chosen.

Applicant has found the process of measuring the amount of flavored syrup added to the container based on time and measuring the amount of flowable confection added to the container based on weight helps to improve the repeatability of creating a certain variety of flavored confection. Because the flowable confection is in a frozen, yet flowable state, the viscosity of the flowable confection is highly variable based on the temperature at which it is stored in the barrel. Therefore, dispensing the flowable confection based on time may result in different amounts of flowable confection entering the container, changing the ratio of flowable confection to flavored syrup and changing the flavor profile of the flavored confection. At relatively higher temperatures, when the flowable confection is less viscous, a greater amount of flowable confection will be added to the container. At relatively lower temperatures, when the flowable confection is more viscous, a smaller amount of flowable confection is added to the container so that there is more flavored syrup with respect to the amount of flowable confection.

Applicant has found the amount of flavored syrup dispensed over a certain period of time is not as temperature sensitive as the flowable confection. The flavored syrup is often stored at room temperature, so a temperature change of, for example ±30° F. will not affect the viscosity of the flavored syrup as much as a similar change in temperature of the flowable confection in the freezer. Additionally, the flow rate and the consistency of the flowable confection is also affected by the amount of overrun, or air, mixed into the flowable confection.

Because the viscosity of the flavored syrup is not as affected by changes in temperature and overrun as the flowable confection, the volume and weight of the flavored syrup dispensed can be more accurately measured by actuation time of the syrup pump. Therefore, the amount of flavored syrup dispensed as function of time is more likely to stay constant than the amount of flowable confection as a function of time allowing the weight of the flavored syrup to be accurately calculated based on how much syrup is known to be dispensed in a certain amount of time. The known weight of the container and the known weight for the amount of syrup to be added to the container can be subtracted by the weight measured by the load cell to calculate the amount of flowable confection that has been added to the container. This calculation can be used to ensure that the correct weight ratio of flowable confection to flavored syrup is achieved, providing the correct flavor profile for a desired flavored confection.

The following numbered clauses set out specific embodiments that may be useful in understanding the present invention:

1. A method of dispensing a flavored confection comprising:
   - dispensing flavored syrup into a container from a syrup nozzle for a predetermined period of time; and
   - dispensing a flowable confection into the container from a confection valve until the container reaches a predetermined weight.
2. The method of clause 1, wherein the predetermined weight is less than a final settled weight of the container containing flowable confection after said dispensing of flowable confection.
3. The method of any preceding clause, wherein the predetermined weight includes a weight of the container without flowable confection.
4. The method of any preceding clause, wherein the flavored syrup and the flowable confection are dispensed into the container simultaneously.
5. The method of any preceding clause, wherein the flavored syrup and the flowable confection are dispensed into the container serially.
6. The method of any preceding clause, further comprising:
   - weighing the container containing the flowable confection dispensed into the container using a load cell.
7. The method of clause 6, further comprising:
   - controlling the dispensing of the flavored syrup and the dispensing of the flowable confection using a controller electrically connected to said load cell;
   - wherein the controller includes a memory that stores the predetermined period of time for which the flavored syrup is dispensed for a desired variety of flavored confection and/or serving sizes;
   - wherein the memory of the controller stores the predetermined weight until which the flowable confection is dispensed for the desired variety of flavored confection and/or serving sizes; and
   - wherein the controller measures a total weight of the container and contents thereof using the load cell, and the controller stops dispensing of the flowable confection when the total weight reaches the predetermined weight.
8. The method of any preceding clause, further comprising:
   - selecting on a user interface a serving size of flowable confection to be dispensed and the flavored syrup; and
   - selecting on the user interface a desired flavor of syrup from a plurality of syrups.
9. The method of any preceding clause, further comprising:
   - mixing the flavored syrup and the flowable confection within the container.
10. A method of dispensing a flavored confection comprising:
    - selecting on a user interface a variety of flavored confection to be dispensed by the method of clause 1; and
    - wherein the variety of flavored confection that is chosen determines the flavor of flavored syrup that is dispensed into the container.
11. An apparatus for dispensing a flavored confection comprising:
    - a freezer configured to hold a flowable confection;
    - a syrup delivery system including one or more syrup pumps, and wherein said one or more syrup pumps are configured to deliver a flavored syrup into a container;
    - a load cell assembly for holding the container adjacent to said freezer, wherein said load cell assembly includes a load cell configured to measure a weight of the container and contents thereof;
    - wherein said syrup pump delivers the flavored syrup into the container for a predetermined period of time; and
    - wherein the flowable confection is delivered from said freezer to the container until said load cell measures a predetermined weight for the container and contents thereof.

12. The apparatus of clause 11, wherein the predetermined weight is less than a final settled weight of the container containing flowable confection after dispensing said flowable confection.
13. The apparatus of any one of clauses 1 through 12, further comprising:
a controller in electrical communication with said load cell, wherein said load cell is configured to communicate the measured weight of the container and the flowable confection and flavored syrup held within the container to said controller;
wherein said controller includes a memory for storing the predetermined period of time for delivery of the flavored syrup and wherein said memory stores the predetermined weight for the container and the flavored syrup and flowable confection within the container; and
wherein said controller ceases delivery of the flavored syrup after the predetermined period of time elapses and wherein said controller ceases delivery of the flowable confection after the predetermined weight as measured by the load cell has been reached.
14. The apparatus of any one of clauses 11 through 13, further comprising:
a confection valve in communication with the freezer, wherein said confection valve is configured to allow the flowable confection to flow from said freezer into the container when the container is positioned adjacent to said confection valve.
15. The apparatus of any one of clauses 11 through 14, wherein each of said one or more syrup pumps includes:
a syrup storage tray, wherein said syrup storage tray holds a quantity of flavored syrup;
a syrup nozzle configured to dispense flavored syrup from the syrup storage tray into a container when the container is adjacent to said syrup nozzle; and
a syrup delivery tube extending between said syrup storage tray and said syrup nozzle, and wherein flavored syrup is delivered from said syrup storage tray to said syrup nozzle through said syrup delivery tube.
16. The apparatus of any one of clauses 11 through 15, wherein the syrup delivery system includes a plurality of syrup pumps, and wherein each syrup pump is configured to deliver a different flavor of flavored syrup.
17. The apparatus of any one of clauses 11 through 16, further comprising:
a user interface configured to allow a user to select characteristics of the flavored confection.
18. The apparatus of clause 17,
wherein said user interface enables a user to choose a variety of flavored confection from a plurality of varieties of flavored confections; and
wherein the variety of flavored confection chosen determines the flavor of flavored syrup that is delivered by the syrup delivery system.
19. The apparatus of any one of clauses 17 through 18,
wherein said user interface enables a user to select a serving size of flowable confection to be dispensed and the flavored syrup; and
wherein the predetermined weight for the container is dependent on the serving size selected on the user interface.
20. The apparatus of any one of clauses 11 through 19, wherein the flowable confection and the flavored syrup are delivered simultaneously.
21. The apparatus of any one of clauses 11 through 20, wherein the flowable confection and the flavored syrup are delivered from different nozzles.
22. The apparatus of any one of clauses 11 through 21, wherein the flowable confection and the flavored syrup are delivered serially.
23. A method of calibration comprising:
dispensing flavored syrup from a syrup nozzle into an empty container for a set period of time;
measuring a weight of flavored syrup dispensed into said container during said set period of time; and
calculating a flavored syrup dispense rate by comparing said weight of flavored syrup dispensed into said container with said set period of time.
24. The method of calibration of clause 23, further comprising:
determining a predetermined period of time for dispensing a desired amount of flavored syrup based on the flavored syrup dispense rate to create a flavored confection for a specified serving size and flavor.
25. A method of calibration comprising:
dispensing a flowable confection into a container from a confection valve until the container reaches a predetermined weight;
instructing the confection valve to close when the container reaches the predetermined weight;
measuring a final settled weight of the container that includes a weight of additional flowable confection added to the container after the confection valve has been instructed to close; and
calculating the weight of additional flowable confection added to the container after the confection valve has been instructed to close by subtracting the predetermined weight from the final settled weight.
determining a predetermined weight for a specified serving size based on the calculated weight of additional flowable confection.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus for dispensing a flavored confection comprising:
a freezer configured to hold a flowable confection;
a syrup delivery system including one or more syrup pumps, and wherein said one or more syrup pumps are configured to deliver a flavored syrup into a container;
a load cell assembly for holding the container adjacent to said freezer, wherein said load cell assembly includes a load cell configured to measure a weight of the container and contents thereof, the load cell assembly comprises a load cell arm that extends from each side of a load cell base, the load cell arm defines a container opening, wherein the load cell arm is configured to support a container that is disposed within the container opening with the load cell arm supporting the container near a lid portion of the container rather than underneath the container, such that the load cell assembly can hold a variety of different sizes of containers at a same distance from a confection valve for delivering a flavored confection and a syrup nozzle of the syrup delivery system, wherein the load cell arm is two arms that each extend from the load cell base in a spaced apart manner to establish the container opening therebetween, and the two load cell arms collectively include a semi-circular lip that is disposed upon an inner portion of each of the two load cell arms, and wherein the semi-circular lip defines the container opening;

wherein said syrup pump delivers the flavored syrup into the container for a predetermined period of time; and wherein the flowable confection is dispensed from said freezer through the confection valve to the container until said load cell measures a predetermined weight for the container and contents thereof.

2. The apparatus of claim 1, wherein the predetermined weight for the container and contents thereof is less than a final settled weight of the container containing flowable confection after dispensing said flowable confection.

3. The apparatus of claim 1, further comprising:

a controller in electrical communication with said load cell, wherein said load cell is configured to communicate the measured weight of the container and the flowable confection and flavored syrup held within the container to said controller;

wherein said controller includes a memory for storing the predetermined period of time for delivery of the flavored syrup and wherein said memory stores the predetermined weight for the container and the flavored syrup and flowable confection within the container; and wherein said controller ceases delivery of the flavored syrup after the predetermined period of time elapses and wherein said controller ceases delivery of the flowable confection after the predetermined weight as measured by the load cell has been reached.

4. The apparatus of claim 1, wherein:

said confection valve is configured to allow the flowable confection to flow from said freezer into the container when the container is positioned adjacent to said confection valve.

5. The apparatus of claim 1, wherein each of said one or more syrup pumps includes:

a syrup storage tray, wherein said syrup storage tray holds a quantity of flavored syrup;

a syrup nozzle configured to dispense flavored syrup from the syrup storage tray into a container when the container is adjacent to said syrup nozzle; and a syrup delivery tube extending between said syrup storage tray and said syrup nozzle, and wherein flavored syrup is delivered from said syrup storage tray to said syrup nozzle through said syrup delivery tube.

6. The apparatus of claim 1, wherein the syrup delivery system includes a plurality of syrup pumps, and wherein each syrup pump is configured to deliver a different flavor of flavored syrup.

7. The apparatus of claim 1, further comprising:

a user interface configured to allow a user to select characteristics of the flavored confection.

8. The apparatus of claim 7, wherein said user interface enables a user to choose a variety of flavored confection from a plurality of varieties of flavored confections; and wherein the variety of flavored confection chosen determines the flavor of flavored syrup that is delivered by the syrup delivery system.

9. The apparatus of claim 7, wherein said user interface enables a user to select a serving size of flowable confection to be dispensed and the flavored syrup; and wherein the predetermined weight for the container and contents thereof is dependent on the serving size selected on the user interface.

10. The apparatus of claim 1, wherein the flowable confection and the flavored syrup are delivered simultaneously.

11. The apparatus of claim 10, wherein the flowable confection and the flavored syrup are delivered from different nozzles.

12. The apparatus of claim 1, wherein the flowable confection and the flavored syrup are delivered serially.

13. The apparatus of claim 1, wherein the two load cell arms are parallel to each other.

14. An apparatus for dispensing a flavored confection comprising:

a freezer configured to hold a flowable confection;

a syrup delivery system including one or more syrup pumps, and wherein said one or more syrup pumps are configured to deliver a flavored syrup into a container;

a load cell assembly for holding the container adjacent to said freezer, wherein said load cell assembly includes a load cell configured to measure a weight of the container and contents thereof, the load cell assembly comprises a load cell arm that extends from each side of a load cell base, the load cell arm defines a container opening, wherein the load cell arm is configured to support a container that is disposed within the container opening with the load cell arm supporting the container near a lid portion of the container rather than underneath the container, such that the load cell assembly can hold a variety of different sizes of containers at a same distance from a confection valve for delivering a flavored confection and a syrup nozzle of the syrup delivery system, wherein the load cell arm is two arms that each extend from the load cell base in a spaced apart manner to establish the container opening therebetween, and the two load cell arms are fixed with respect to each other and establish a lip that is disposed upon an inner portion of each of the two load cell arms, and wherein the lip defines the container opening;

wherein said syrup pump delivers the flavored syrup into the container for a predetermined period of time; and wherein the flowable confection is dispensed from said freezer through the confection valve to the container until said load cell measures a predetermined weight for the container and contents thereof.

15. The apparatus of claim 14, further comprising:

a controller in electrical communication with said load cell, wherein said load cell is configured to communicate the measured weight of the container and the flowable confection and flavored syrup held within the container to said controller;

wherein said controller includes a memory for storing the predetermined period of time for delivery of the flavored syrup and wherein said memory stores the predetermined weight for the container and the flavored syrup and flowable confection within the container; and wherein said controller ceases delivery of the flavored syrup after the predetermined period of time elapses and wherein said controller ceases delivery of the flowable confection after the predetermined weight as measured by the load cell has been reached.

16. The apparatus of claim 14, wherein the two load cell arms are parallel to each other.

17. The apparatus of claim 14, wherein each of said one or more syrup pumps includes:

a syrup storage tray, wherein said syrup storage tray holds a quantity of flavored syrup;

a syrup nozzle configured to dispense flavored syrup from the syrup storage tray into a container when the container is adjacent to said syrup nozzle; and a syrup delivery tube extending between said syrup storage tray and said syrup nozzle, and wherein flavored syrup is delivered from said syrup storage tray to said syrup nozzle through said syrup delivery tube.

18. The apparatus of claim 14, further comprising:

a user interface configured to allow a user to select characteristics of the flavored confection.

19. The apparatus of claim 18, wherein said user interface enables a user to choose a variety of flavored confection from a plurality of varieties of flavored confections; and wherein the variety of flavored confection chosen determines the flavor of flavored syrup that is delivered by the syrup delivery system.

20. The apparatus of claim 18, wherein said user interface enables a user to select a serving size of flowable confection to be dispensed and the flavored syrup; and wherein the predetermined weight for the container and contents thereof is dependent on the serving size selected on the user interface.

* * * * *